(12) United States Patent
Koryakin et al.

(10) Patent No.: US 11,068,269 B1
(45) Date of Patent: Jul. 20, 2021

(54) INSTRUCTION DECODING USING HASH TABLES

(71) Applicant: Parallels International GmbH, Schaffhausen (CH)

(72) Inventors: Alexey Koryakin, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 123 days.

(21) Appl. No.: 16/417,033

(22) Filed: May 20, 2019

(51) Int. Cl.
*G06F 9/30* (2018.01)
*G06F 16/901* (2019.01)

(52) U.S. Cl.
CPC ...... *G06F 9/30167* (2013.01); *G06F 9/30036* (2013.01); *G06F 16/9014* (2019.01); *G06F 16/9027* (2019.01)

(58) Field of Classification Search
None
See application file for complete search history.

(56) References Cited

U.S. PATENT DOCUMENTS

| | | | | |
|---|---|---|---|---|
| 5,903,760 A * | 5/1999 | Farber | ...... | G06F 8/443 712/E9.037 |
| 6,044,220 A * | 3/2000 | Breternitz, Jr. | ...... | G06F 9/45504 717/139 |
| 7,539,691 B2 * | 5/2009 | Wortendyke | ...... | G06F 16/951 |
| 8,826,439 B1 * | 9/2014 | Hu | ...... | G06F 21/56 726/24 |
| 9,361,458 B1 * | 6/2016 | Feng | ...... | G06F 21/564 |
| 2004/0190526 A1 * | 9/2004 | Kumar | ...... | H04L 47/10 370/395.21 |
| 2006/0041873 A1 * | 2/2006 | Pandarinathan | ...... | G06F 8/71 717/141 |
| 2011/0072238 A1 * | 3/2011 | Mimar | ...... | G06F 9/30145 712/22 |
| 2011/0172969 A1 * | 7/2011 | Gara | ...... | G06F 9/30021 702/186 |
| 2012/0284461 A1 * | 11/2012 | Larin | ...... | G06F 9/30178 711/125 |
| 2015/0032999 A1 * | 1/2015 | Muff | ...... | G06F 9/30181 712/210 |
| 2017/0063613 A1 * | 3/2017 | Bloch | ...... | H04L 12/44 |
| 2017/0177367 A1 * | 6/2017 | DeHon | ...... | G06F 9/3867 |

OTHER PUBLICATIONS

Arm Instruction Set, Version 1.0, Reference Guide, Part C, https://static.docs.arm.com/100076/0100/arm_instruction_set_reference_guide_100076_0100_00_en.pdf, 2018, 514 pages.

* cited by examiner

*Primary Examiner* — Eric Coleman
(74) *Attorney, Agent, or Firm* — Rosenberg, Klein & Lee

(57) ABSTRACT

Systems and methods for instruction decoding using hash tables. An example method of constructing a decoding tree comprises: generating an aggregated vector of differentiating bit scores representing at least a subset of a set of processor instructions; identifying, based on the aggregated vector of differentiating bit scores, one or more opcode bit positions; and constructing a hash table implementing a current level of a decoding tree representing the subset of the set of processor instructions, wherein the hash table is indexed by one or more opcode bits identified by the one or more opcode bit positions.

21 Claims, 9 Drawing Sheets

| 110 instruction name | 120 opcode value | 130 opcode mask | 140 binary opcode readable representation (value & mask) 31 30 29 28 27 26 25 24 23 22 21 20 19 18 17 16 15 14 13 12 11 10 9 8 7 6 5 4 3 2 1 0 |
|---|---|---|---|
| add reg | 0x00800000 | 0x0fe00010 | (. . . . 0 0 0 0 1 0 0 . . . . . . . . . . . . . . . . 0 . . . ) |
| add imm | 0x02800000 | 0x0fe00000 | (. . . . 0 0 1 0 1 0 0 . . . . . . . . . . . . . . . . . . . . ) |
| sub imm | 0x02400000 | 0x0fe00000 | (. . . . 0 0 1 0 0 1 0 . . . . . . . . . . . . . . . . . . . . ) |
| b | 0x0a000000 | 0x0f000000 | (. . . . 1 0 1 0 . . . . . . . . . . . . . . . . . . . . . . . ) |
| blx | 0xfa000000 | 0xfe000000 | (1 1 1 1 1 0 1 . . . . . . . . . . . . . . . . . . . . . . . . ) |
| str imm | 0x04000000 | 0x0e500000 | (. . . . 0 1 0 . . 0 . 0 . . . . . . . . . . . . . . . . . . . ) |
| ldr imm | 0x04100000 | 0x0e500000 | (. . . . 0 1 0 . . 0 . 1 . . . . . . . . . . . . . . . . . . . ) |
| dmb | 0xf57ff050 | 0xfffffff0 | (1 1 1 1 0 1 0 1 0 1 1 1 1 1 1 1 1 1 1 1 1 1 1 1 0 1 0 1 . . . . ) |
| pld | 0xf510f000 | 0xff30f000 | (1 1 1 1 0 1 0 1 . . 0 1 . . . . 1 1 1 1 . . . . . . . . . . . . ) |

FIG. 1

| runtime weight | instruction name | opcode value | opcode mask | binary opcode readable representation (value & mask) 31 30 29 28 27 26 25 24 23 22 21 20 19 18 17 16 15 14 13 12 11 10 9 8 7 6 5 4 3 2 1 0 |
|---|---|---|---|---|
| 200 | ldr imm | 0x04100000 | 0x0e500000 | ( . . . 0 1 0 . 0 . . 1 . . . . . . . . . . . . . . . . . . . . . ) |
| 150 | str imm | 0x04000000 | 0x0e500000 | ( . . . 0 1 0 . 0 . . 0 . . . . . . . . . . . . . . . . . . . . . ) |
| 90 | b | 0x0a000000 | 0x0f000000 | ( . . . . 1 0 1 0 . . . . . . . . . . . . . . . . . . . . . . . . ) |
| 80 | add imm | 0x02800000 | 0x0fe00000 | ( . . . . 0 0 1 0 1 0 0 . . . . . . . . . . . . . . . . . . . . . ) |
| 40 | sub imm | 0x02400000 | 0x0fe00000 | ( . . . . 0 0 1 0 0 1 0 . . . . . . . . . . . . . . . . . . . . . ) |
| 10 | add reg | 0x00800000 | 0x0fe00010 | ( . . . . 0 0 0 0 1 0 0 . . . . . . . . . . . . . . . . . 0 . . . ) |
| 7 | dmb | 0xf57ff050 | 0xfffffff0 | ( 1 1 1 1 0 1 0 1 0 1 1 1 1 1 1 1 1 1 1 1 0 0 0 0 0 1 0 1 . . . . ) |
| 5 | pld | 0xf510f000 | 0xff30f000 | ( 1 1 1 1 0 1 0 1 . . 0 1 . . . . 1 1 1 1 . . . . . . . . . . . . ) |
| 3 | blx | 0xfa000000 | 0xfe000000 | ( 1 1 1 1 1 0 1 . . . . . . . . . . . . . . . . . . . . . . . . . ) |

FIG. 2

INSTRUCTION DECODING USING HASH TABLES

TECHNICAL FIELD

The present disclosure is generally related to processor instruction decoding, and is specifically related to instruction decoding using hash tables.

BACKGROUND

A processor executing series of instructions stored in the memory and referenced by the instruction pointer register (e.g. "instruction pointer" (RIP, EIP, or IP) in the IA-32 and AMD64 instruction set architectures, or "program counter" (PC) in ARM instruction set architecture) may implement a multi-stage pipeline, which includes at least the following stages: instruction fetch, decode, and execute.

DESCRIPTION OF DRAWINGS

FIG. 1 schematically illustrates an example truncated instructions set, in accordance with one or more aspects of the present disclosure;

FIG. 2 schematically illustrates runtime weight values of the example truncated instructions set, in accordance with one or more aspects of the present disclosure;

DETAILED DESCRIPTION

Figure 3:
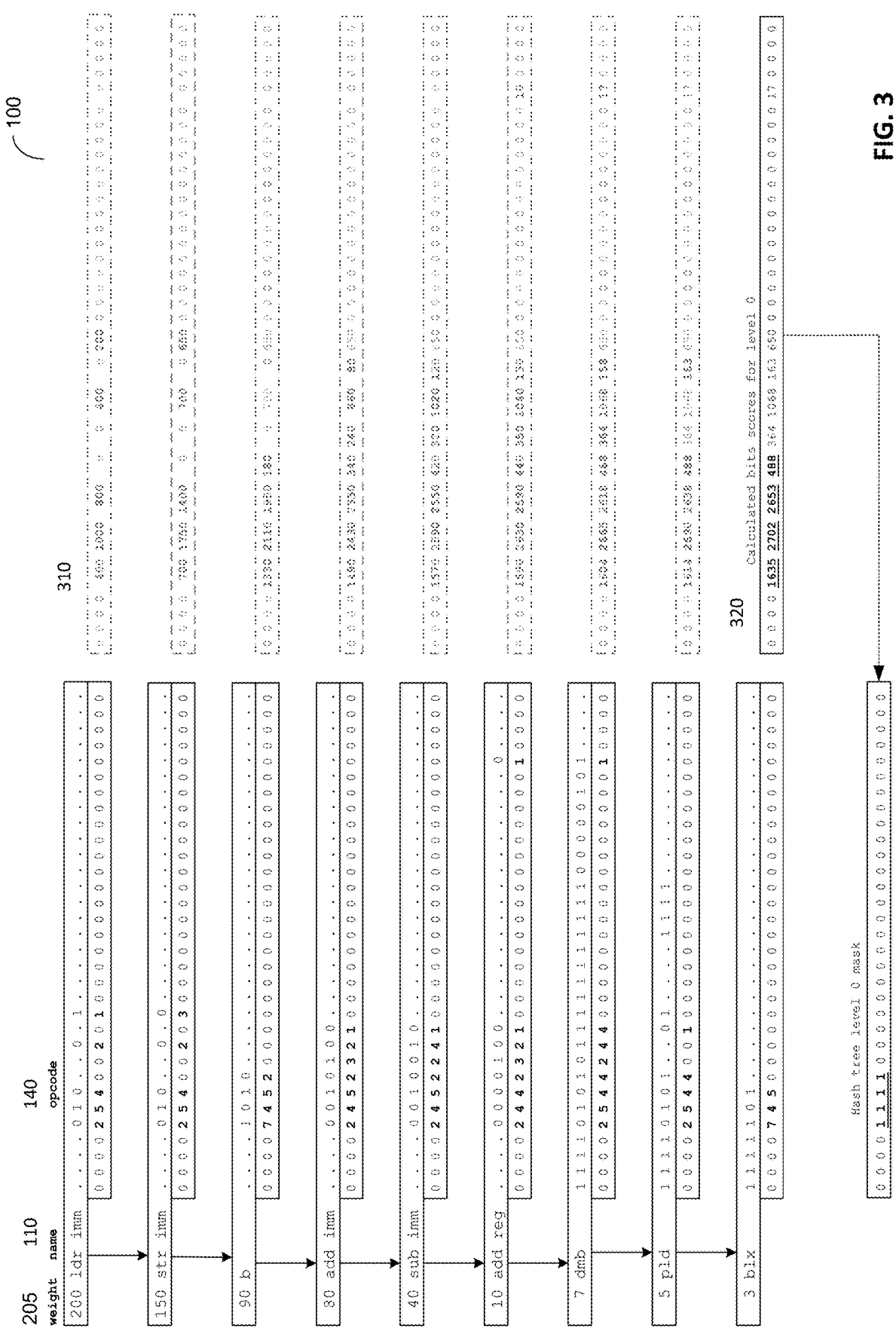
FIG. 3 schematically illustrates an example method of identifying opcode bit positions to be utilized for hash table indexing, in accordance with one or more aspects of the present disclosure.

Described herein are systems and methods for processor instruction decoding using hash tables. Systems and methods described herein may be utilized for implementing binary translation of series of executable instructions, emulation of series of executable instructions, disassembly of series of executable instructions, debugging of series of executable instructions, and/or various other tasks which involve instruction decoding.

In various illustrative examples, binary translation of a source code executable on a source processor architecture (platform) produces a target code executable on a target processor architecture (platform). The target platform is generally different from the source platform, however, in certain implementations, the target platform may match the source platform (e.g., for implementing virtualization solutions). Accordingly, binary translation involves retrieving an instruction from memory, decoding the instruction, and generating corresponding instruction(s) of the target instruction set. Similarly, processor virtualization involves retrieving an instruction from memory, decoding the instruction, and emulating or translating the instruction into the host platform instruction set. Disassembly or debugging involves retrieving an instruction from memory, decoding the instruction, and translating the instruction into its mnemonic representation from the relevant assembly language.

Thus, binary translation, emulation, disassembly, debugging, and/or various other tasks may involve instruction decoding, which may involve identifying an executable instruction encoded by an input bit sequence, and optionally identifying the instruction parameters. "Opcode" herein refers to a portion of an executable instruction that specifies the operation to be performed (e.g., the opcode corresponding to the MOV instruction utilized in certain processor architectures specifies copying the contents of the source memory or register to the target memory or register).

In accordance with one or more aspects of the present disclosure, for at least a subset of the instruction set, a hash table is constructed for each level of the decoding tree. Constructing the hash table involves traversing the instructions and identifying opcode bit positions to be utilized as the index for the hash table implementing the current level of the instruction decoding tree, while excluding from consideration any opcode bit positions which have been used as a hash table index at any of the previous levels of the decoding tree. The opcode bit positions to be utilized for hash table indexing are identified based on the frequency of occurrence of each instruction in the decoded instruction stream. Accordingly, the hash tables may periodically be re-built to reflect the latest processed instructions. The next level of the decoding tree is constructed by recursively repeating the hash table constructing procedure if any value of the current level hash table index references two or more instructions of the instruction set.

Accordingly, instruction decoding would involve, for a given input bit sequence, retrieving from the hash table implementing the current level of the decoding tree, the result of combining the input bit sequence with the mask specifying the bit positions of the current level index; the decoding procedure is repeated if the computed index references two or more instructions of the instruction set, until a single instruction is identified, as described in more detail herein below.

FIG. 1 schematically illustrates an example truncated instruction set 100 utilized for illustrating the systems and methods of the present disclosure. As schematically illustrated by FIG. 1, instructions of the example instruction set 100 have a fixed width (32 bits), and the position of the significant opcode bits for each instruction is specified by a corresponding opcode mask. Accordingly, for each instruction, FIG. 1 shows its mnemonics 110, the opcode value 120, the opcode mask 130, and the binary representation 140 of the opcode value 120 masked by the opcode mask 130 (i.e., the result of applying Boolean multiplication (bitwise "AND") operation to the opcode value 120 and the opcode mask 130). For illustrative purposes, in the binary opcode representation 140, the bits that are not selected by the corresponding opcode mask (i.e., those bits of the binary opcode representation 140 for which the opcode mask 130 has "0" in corresponding bit positions) are shown with dots. The binary opcode representation 140 is shown for more convenient visualization of opcode value 120 and mask 130. In various implementations of the systems and methods described herein, no additional data structure is needed to store the binary opcode representation 140.

As seen from FIG. 1, only three bits (i.e., bits 25-27) are presented in the opcodes of all instructions of the example instruction set, while other significant opcode bits may have different positions for different instructions of the example instruction set, which may hinder the efficient instruction decoding. For example, "branch" ("b") and "extended branch" ("blx") instructions have exactly the same opcode bits in positions 25-27, and thus, in order to distinguish those two instructions, other opcode bit positions (i.e., bit positions 28-31) need to be analyzed.

The systems and methods of the present disclosure improve the instruction decoding efficiency by producing optimized decoding trees which take into account the decoding statistics, and in particular, the frequency of occurrence of each instruction in the decoded instruction stream. The instruction frequencies may be dynamically modified with each processed instruction, thus effectively adapting to potentially varying code profiles. Accordingly, the decoding trees produced by the systems and methods of the present disclosure have the shortest path from the root of the tree corresponding to the masked instruction opcode to the terminal leaf corresponding to the fully-identified instruction.

While the examples herein reference the truncated instruction set 100 of FIG. 1, which includes certain instructions of ARM instruction set architecture, the methods and systems of the present disclosure are equally applicable to other instruction set architectures (including instruction set architectures having fixed-width and variable-width instructions), in which the significant bit positions of the instruction opcode may be identified by a corresponding opcode mask.

Furthermore, while the above description and examples are related to binary instruction decoding, the systems and methods described herein may be similarly applied to various other binary search tasks, in which an array of data structures is indexed by a fixed width or a variable width binary key. The systems and methods of the present disclosure may be advantageously used to efficiently map an input bit sequence representing the key value to a corresponding data structure specified by the array.

Various aspects of the above referenced methods and systems are described in details herein below by way of examples, rather than by way of limitation.

As schematically illustrated by FIG. 2, each instruction of the example truncated instruction set 100 may be associated with a corresponding runtime weight value 205 reflecting the frequency of occurrence of the instruction in the decoded instruction stream. In an illustrative example, the runtime weight value 205 may be produced by normalizing (e.g., dividing by a chosen normalization factor) the number of occurrences of the given instruction in the decoded instruction stream. Since the instruction runtime weight reflects the frequency of instruction occurrence in the decoded instruction stream, the instructions having largest runtime weight values should be recognized in the most efficient manner, in order to improve the overall decoding efficiency. Accordingly, in the illustrative example of FIGS. 2-3, the example instruction set 100 is sorted in the reverse order of the runtime weights 205, although in other implementations, other sorting orders or no sorting at all may be implemented.

FIG. 3 schematically illustrates an example method of identifying opcode bit positions to be utilized for hash table indexing, in accordance with one or more aspects of the present disclosure. As schematically illustrated by FIG. 3, the method may traverse the instruction set; for every instruction of the instruction set, the method may traverse the significant opcode bits (i.e., the bits that are selected by applying the opcode mask, or, in other words, the opcode bits having bit positions corresponding to the value of "1" in the opcode mask). For each opcode bit of a given instruction, the method may determine the number of instructions in the instruction set which have the complementary, with respect to the current instruction, bit value in the same position as the current opcode bit (in other words, if the instruction "ldr" has "0" in bit position 27, the method would determine the number of instructions of the instruction set which have "1" in the same bit position; as seen in FIG. 3, there are two such instructions: "b" and "blx"). Thus, for every instruction of the instruction set, the method would produce a corresponding vector of differentiating opcode bit scores, which is an integer vector having the size equal to the instruction width. Each vector element reflects the probability of differentiating the corresponding instruction from other instructions of the instruction sets based only on the opcode bit whose bit position is equal to the index of the vector element. Accordingly, each vector element whose index corresponds to the position of a non-significant opcode bit in the opcode mask (i.e., a vector element whose index corresponds to the value of "0" in the opcode mask) would be set to zero. Conversely, each vector element whose index corresponds to the position of a significant opcode bit (i.e., a vector element whose index corresponds to the value of "1" in the opcode mask) would be set to the number of instructions in the instruction set which have the complementary, with respect to the instruction associated with the vector of differentiating opcode bit scores, bit value in the position identified by the index of the element.

Because the above-described computation of differentiating opcode bit scores above depends more on the significant bit value ("0" or "1") in a particular position than on a concrete instruction, the decoding process may be further optimized by introducing two vectors: one vector for significant "0"s and another one for significant "1"s. Each element of the first vector represents the number of instructions having the value of "1" in the bit position identified by the index of the vector element; conversely, each element of the first vector represents the number of instructions having the value of "0" in the bit position identified by the index of the vector element.

Responsive to constructing the vector 310 of differentiating opcode bit scores for a given instruction, the method may multiply the vector element by the runtime weight of the instruction, thus producing the weighted vector of differentiating opcode bit scores. In certain implementations, a separate weighted vector of differentiating opcode bit scores is generated for every instruction of the example instruction set. The method may further compute an aggregated vector of differentiating opcode bit scores reflecting the opcode bit diversity in the example instruction set, by summing up all instruction-specific vectors of differentiating opcode bit scores, such that each element of the aggregated vector would be represented by a sum of elements of instruction-specific vectors having the same index as the element of the aggregated vector. Alternatively, instead of storing all the instruction-specific weighted vectors of differentiating opcode bit scores, the method may, as shown in FIG. 3, traverse the instruction set and iteratively compute the aggregated vector of differentiating opcode bit scores, by incrementing the current aggregated vector by the instruction-specific vector computed for the given instruction, thus arriving to the aggregated vector 320 without the need to store all intermediate instruction-specific vectors, which are shown in FIG. 3 in dotted lines.

Alternatively, in order to save the memory that would be consumed by storing all the weighted vectors of differentiating opcode bit scores, two vectors may be generated and shared between all instructions of the example instruction set, such that each element of the first vector would store the number of the instructions in the instruction set which have "1" bit value in the position identified by the index of the vector element, while each element of the second vector would store the number of the instructions in the instruction set which have "0" bit value in the position identified by the index of the vector element.

While in illustrative example of FIG. 3 the aggregated vector of differentiating opcode bit scores is 320 constructed by summing up instruction-specific vectors of differentiating opcode bit scores for all instructions of the instruction set 100, in various other implementations, the aggregated vector of differentiating opcode bit scores may be constructed based on a subset including a predetermined number of the most frequently occurring instructions of the instruction set, or based on a subset including the most frequently occurring instructions such that those instruction would cover a predetermined portion (e.g., 95%) of the code being decoded.

The aggregated vector of differentiating opcode bit scores 320 may be utilized for identifying the opcode bit positions to be utilized as the index for a hash table implementing the root level (level 0) of the instruction decoding tree. The bits positions having the largest scores in the aggregated vector of differentiating opcode bit scores would be the best candidates for forming the hash table index, since each opcode bit score reflects diversity of the corresponding opcode bit in the example instruction set. Thus, utilizing a hash table index including a predetermined number of bits whose positions have the largest scores in the aggregated vector of differentiating opcode bit scores would maximize the probability of distinguishing the instruction opcodes by the resulting hash table, thus optimizing the overall efficiency of instruction decoding.

The number of bits to be utilized for forming the hash table index is a parameter of the method, the value of which may be selected based on balancing the overall efficiency of instruction decoding (which would increase with increasing the size of the hash table index) and the amount of memory required for storing the hash table (the number of elements of the hash table, which is 2 to the power of the number of bits in the hash table index, would exponentially grow with increasing the size of the hash table index).

In the illustrative example of FIG. 3, the hash table index is chosen to include four bits which have the largest differentiating opcode bit scores, thus forming the hash table mask filled with zero bits, except for bit positions 24-27 corresponding to the four bits having the largest differentiating opcode bit scores in the aggregated vector of differentiating opcode bit scores.

While in the illustrative example of FIG. 3 the positions of the bits forming the hash table index are consecutive (i.e., without "gaps" between them), in other implementations, at least some gaps between the index-forming bits may be allowed. In certain implementations, the gap size may be a parameter of the method, the value of which may be selected based on balancing the overall efficiency of instruction decoding and the amount of memory required for storing the hash table.

Alternatively, the hash table index can be chosen by more complex schemes. In certain implementations, the bits having the largest aggregated differentiating opcode bit score may be located non-sequentially, i.e., by several bit subsequences, thus requiring a procedure to be implemented for converting locations of the bit subsequences to a joint hash table index. Accordingly, additional computations for determining the joint hash index will need to be performed, thus increasing the processing time of the fast search path. Such an increase may be reasonably if the computational overhead would result in a more balanced decoding tree with significantly fewer amount of hash layers.

Figure 4:
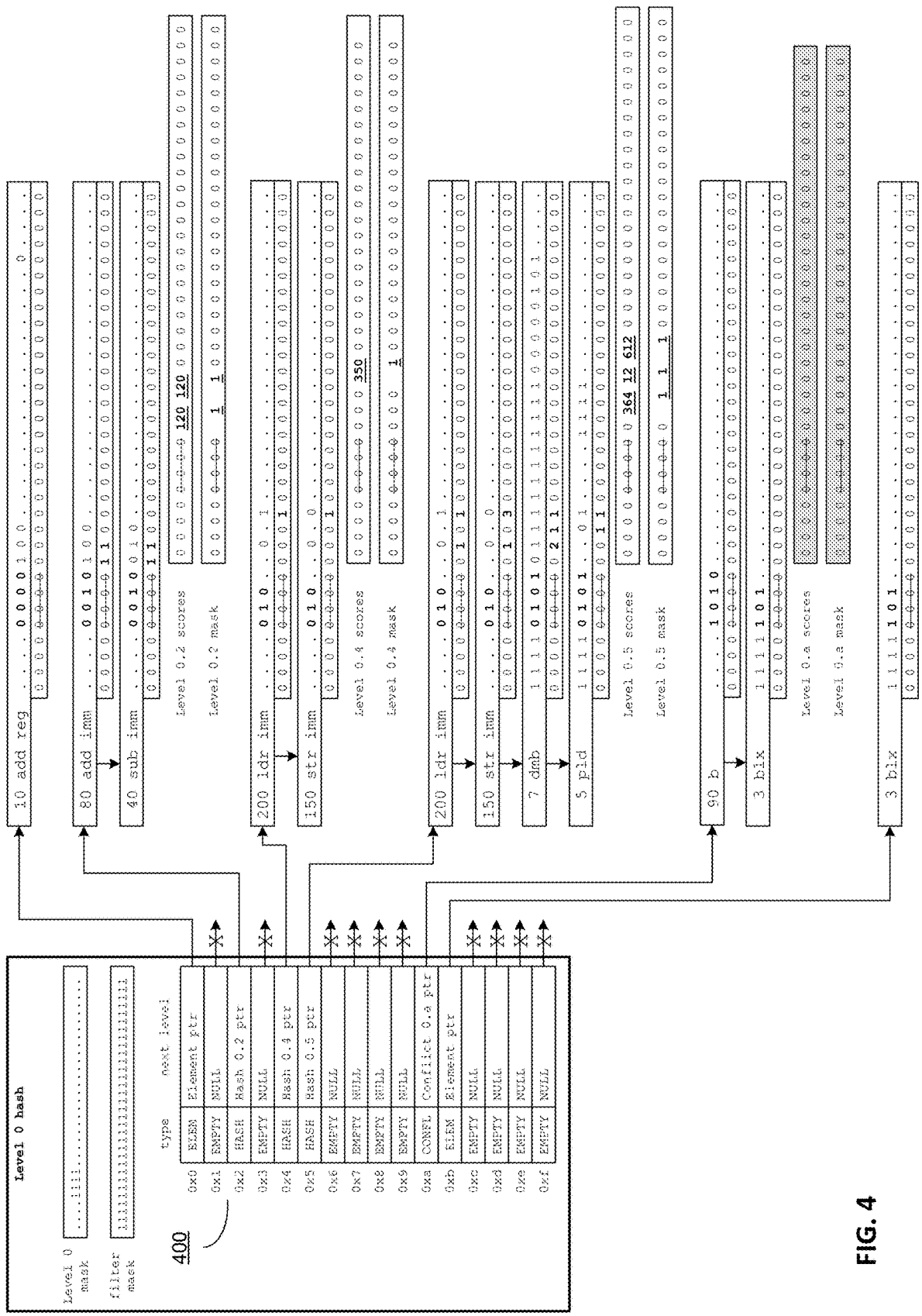
FIG. 4 schematically illustrates an example method of constructing a hash table implementing the root level of the instructing decoding tree, in accordance with one or more aspects of the present disclosure.

Upon choosing the hash table index size and bit positions, the method may proceed to constructing the hash table forming the root level of the instruction decoding tree. As schematically illustrated by FIG. 4, the root level hash table 400 may include 2^N elements, wherein N is the number of bits in the hash table index. The hash table index is the sequence of opcode bits residing in the chosen bit positions (i.e., positions 24-27 in the illustrative example of FIGS. 3-4).

Thus, as schematically illustrated by FIG. 4, the hash table 400 includes 16 elements which are indexed from 0x0 (binary "0000") to 0xf (binary "1111"). Each element of the hash table 400 may belong to one of the following types: an empty element ("EMPTY" type), an element pointer ("ELEM" type), a hash table pointer ("HASH" type), or a pointer to a set of conflicting opcodes ("CONFL" type), as described in more detail herein below. The above-references element types represent a basic set of element types utilized by the illustrative examples described herein. In order to optimize instruction look up, various other element types may be employed.

In an illustrative example, if the index value encodes a bit combination that does not occur in any opcode of the example instruction set (such as 0x1, 0x3, 0x6, 0x7, etc.), the corresponding hash table element is initialized by the NULL value corresponding to the "EMPTY" element type. Should the decoding process chose one of the "EMPTY" elements, an execution exception may be thrown with an error code indicating the invalid opcode (or undefined instruction in some processor architectures).

In another illustrative example, if the index value encodes a bit combination uniquely identifying an instruction from the example instruction set (i.e., the opcode of the identified instruction includes, in the bit positions corresponding to the hash table index bit positions, the bit values corresponding to the index value, such as 0x0 or 0xb, and no other instruction opcode of the example instruction set has the same opcode bits appearing in the same bit positions), the corresponding hash table element is initialized by a pointer of the "ELEM" type, which points to the data structure storing the instruction identifier, the instruction opcode and opcode mask, and other information pertinent to emulating the instruction, displaying the instruction in the debug view, etc.

In yet another illustrative example, if the index value encodes a bit combination that occurs in two or more instructions of the example instruction set (i.e., for each of those instructions, the opcodes includes, in the bit positions corresponding to the hash table index bit positions, the bit values corresponding to the index value, such as 0x2, 0x4, 0x5, etc.), but the instructions may be distinguished by other bits which reside within the bit positions covered by the opcode masks of all such instructions, the corresponding hash table element is initialized by a pointer of the "HASH" type, which points to the hash table implementing the next level of the instruction decoding tree. The above-described procedure of hash table constructing may be repeated for constructing the hash table implementing the next level of the instruction decoding tree (e.g., hash table 0.5 for 0x5 index value).

It should be noted that an instruction may appear in several tree branches of the same hash table level. In the illustrative example of FIG. 4, "ldr" and "str" instructions appear in the two branches identified by the hash table indexes 0x4 and 0x5. This happens because the opcodes of "ldr" and "str" instructions include an insignificant bit 24 (i.e., bit 24 of the opcode mask has the value of "0"), which is included in level 0 of the hash table index. Bit 24 for these instructions can be any of "0" or "1." Therefore, these instructions appear in two branches of the same hash table level.

In particular, as schematically illustrated by FIG. 4, the method may traverse the subset of instructions that are identified by the same index of the root hash table (e.g., "ldr," str," "dmb" and "pld" instructions identified by 0x5 index value of the root hash table). For every instruction of the subset of instructions, the method may traverse the unused significant opcode bits (i.e., the bits that are selected by applying the opcode mask with the exception of the opcode bits that have already been utilized for constructing the index of the root hash table). For each opcode bit of a given instruction, the method may determine the number of instructions in the subset which have the complementary, with respect to the this instruction, bit value in the same position as this opcode bit (in other words, if the instruction "ldr" has "0" in bit position 22, the method would determine the number of instructions of the instruction set which have "1" in the same bit position; as seen in FIG. 4, there is one such instruction, i.e., "dmb"). Thus, for every instruction of the subset of instructions, the method would produce a corresponding vector of differentiating opcode bit scores, which is an integer vector having the size equal to the instruction width. Each vector element is computed to reflect the probability of differentiating the corresponding instruction from other instructions of the subset of instructions based only on the opcode bit whose bit position is equal to the index of the vector element. Accordingly, each vector element the index of which corresponds to the position of a non-significant opcode bit in the opcode mask (i.e., a vector element the index of which corresponds to the value of "0" in the opcode mask) would be set to zero. Conversely, each vector element the index of which corresponds to the position of a previously unused significant opcode bit (i.e., a vector element the index of which corresponds to the value of "1" in the opcode mask) would be set to the number of instructions in the instruction subset which have the complementary, with respect to the this instruction, bit value in the position identified by the index of the element. Responsive to constructing the vector for a given instruction, the method may multiply each vector element by the runtime weight of the instruction, thus producing the weighted vector of differentiating opcode bit scores for the hash table of the next level of the decoding tree (e.g., hash table 0.5).

The method may further compute an aggregated vector of differentiating opcode bit scores reflecting the opcode bit diversity in the subset of instructions, by summing up all instruction-specific vectors of differentiating opcode bit scores, such that each element of the aggregated vector would be represented by a sum of elements of instruction-specific vectors having the same index as the element of the aggregated vector. The resulting aggregated vector of differentiating opcode bit scores may be utilized for identifying the opcode bit positions to be utilized as the index for a hash table implementing the second level of the instruction decoding tree for the subset of instructions. The method may construct a hash table index including a predetermined number of bits whose positions have the largest scores in the aggregated vector of differentiating opcode bit scores reflecting the opcode bit diversity in the subset of instructions.

In the illustrative example of FIG. 4, the hash table index for the second level hash table (hash table 0.5 for 0x5 index value) has the size of three bits. Thus, the hash table index is chosen to include the three bits having the largest differentiating opcode bit scores (bit positions 20-22), thus forming the hash table mask filled with zero bits, except for bit positions 20-22 corresponding to the three bits having the largest differentiating opcode bit scores in the aggregated vector of differentiating opcode bit scores reflecting the opcode bit diversity in the subset of instructions.

While in the illustrative example of FIG. 4 the positions of the bits forming the index for the second level hash table (hash table 0.5 for 0x5 index value) are consecutive (i.e., without "gaps" between them), in other implementations, at least some gaps between the index-forming bits may be allowed. In certain implementations, the gap size may be a parameter of the method, the value of which may be selected based on balancing the overall efficiency of instruction decoding and the amount of memory required for storing the hash table.

Figure 5:
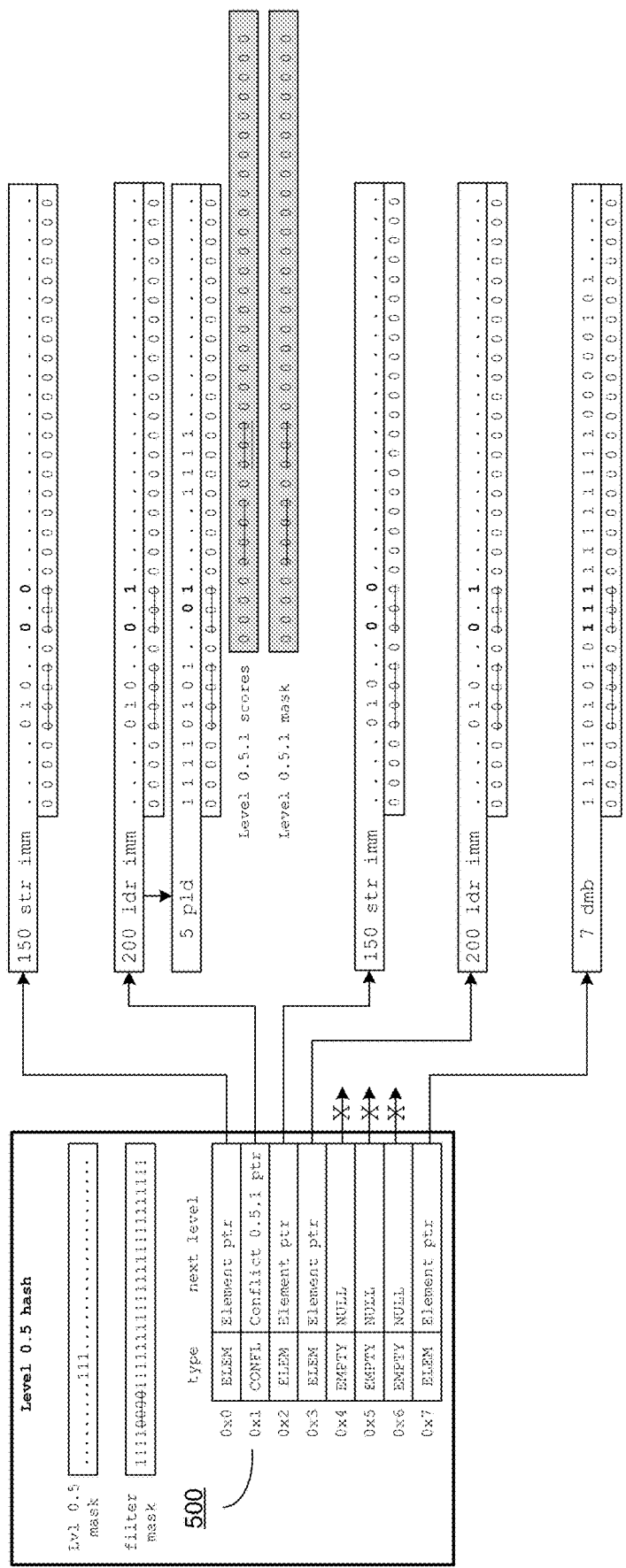
FIG. 5 schematically illustrates an example method of constructing a hash table implementing an intermediate or terminal level of the instructing decoding tree, in accordance with one or more aspects of the present disclosure.

Upon choosing the hash table index size and bit positions, the method may proceed to constructing the hash table forming the second level of the instruction decoding tree (e.g., hash table 0.5 for 0x5 index value). As schematically illustrated by FIG. 5, the second level hash table 500 may include 2^K elements, wherein K is the number of bits in the hash table index. The hash table index is the sequence of opcode bits residing in the chosen bit positions (i.e., positions 20-22 in the illustrative example of FIG. 5).

Thus, as schematically illustrated by FIG. 5, the hash table 500 includes 8 elements which are indexed from 0x0 (binary "000") to 0x7 (binary "111"). Similarly to the root hash table 400, each element of the hash table 500 may belong to one of the following types: an empty element ("EMPTY" type), an element pointer ("ELEM" type), a hash table pointer ("HASH" type), or a pointer to a set of conflicting opcodes ("CONFL" type), as described in more detail herein above.

The above-described procedure for constructing the hash table may be recursively repeated for the subsequent levels of the decoding tree, until a last level hash table is constructed which contains no elements of the "HASH" type (i.e., all elements are either of "ELEM" type, "EMPTY" type, or "CONFL" type).

Figure 6:
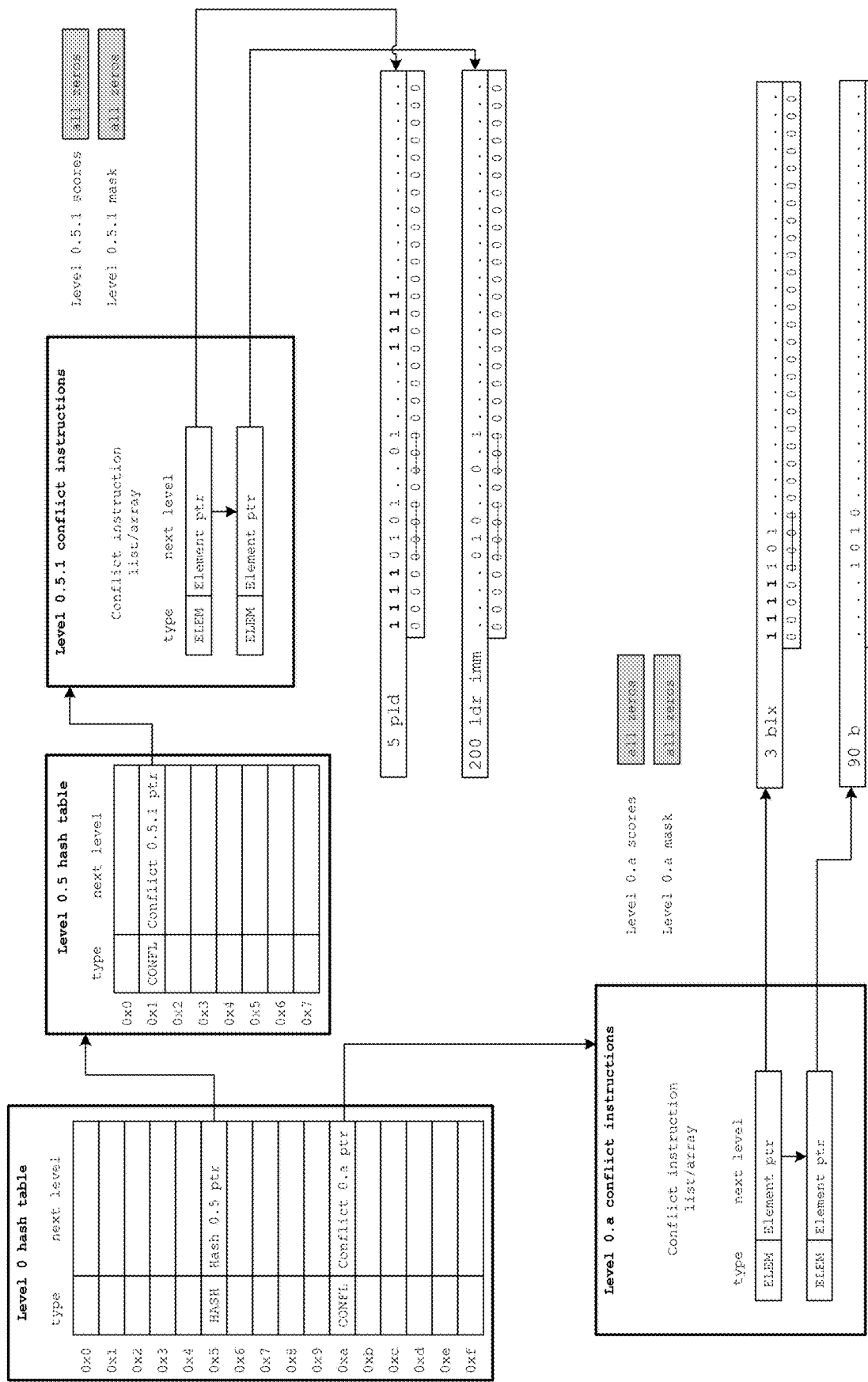
FIG. 6 schematically illustrates an example method of constructing a conflicting instruction list, in accordance with one or more aspects of the present disclosure.

Referring again to FIG. 4, if the index value encodes a bit combination that occurs in two or more instructions of the example instruction set (i.e., for each of those instructions, the opcodes includes, in the bit positions corresponding to the hash table index bit positions, the bit values corresponding to the index value, such as 0x2, 0x4, 0x5, etc.), but the instructions may only be distinguished by other bits, which reside within the bit positions that are not covered by at least one opcode mask of such instructions (due to non-overlapping opcode masks), the corresponding hash table element is initialized by a pointer of the "CONFL" type, which points to an ordered list of two or more instructions identified by the same index value, as schematically illustrated by FIG. 6.

The decoding procedure may traverse the list and compare each candidate instruction on the list to the opcode bits being decoded, masked by the opcode mask corresponding to the candidate instruction, until a match is detected (i.e., the opcode being decoded masked by the opcode mask corresponding to the candidate instruction matches the opcode of the candidate instruction). Accordingly, in certain implementations, the list of conflicting instructions may be ordered in the reverse order of the remaining (i.e., previously unused for hash table indices) significant bits of the opcode mask, in order to improve the overall efficiency of the decoding process.

Figure 8:
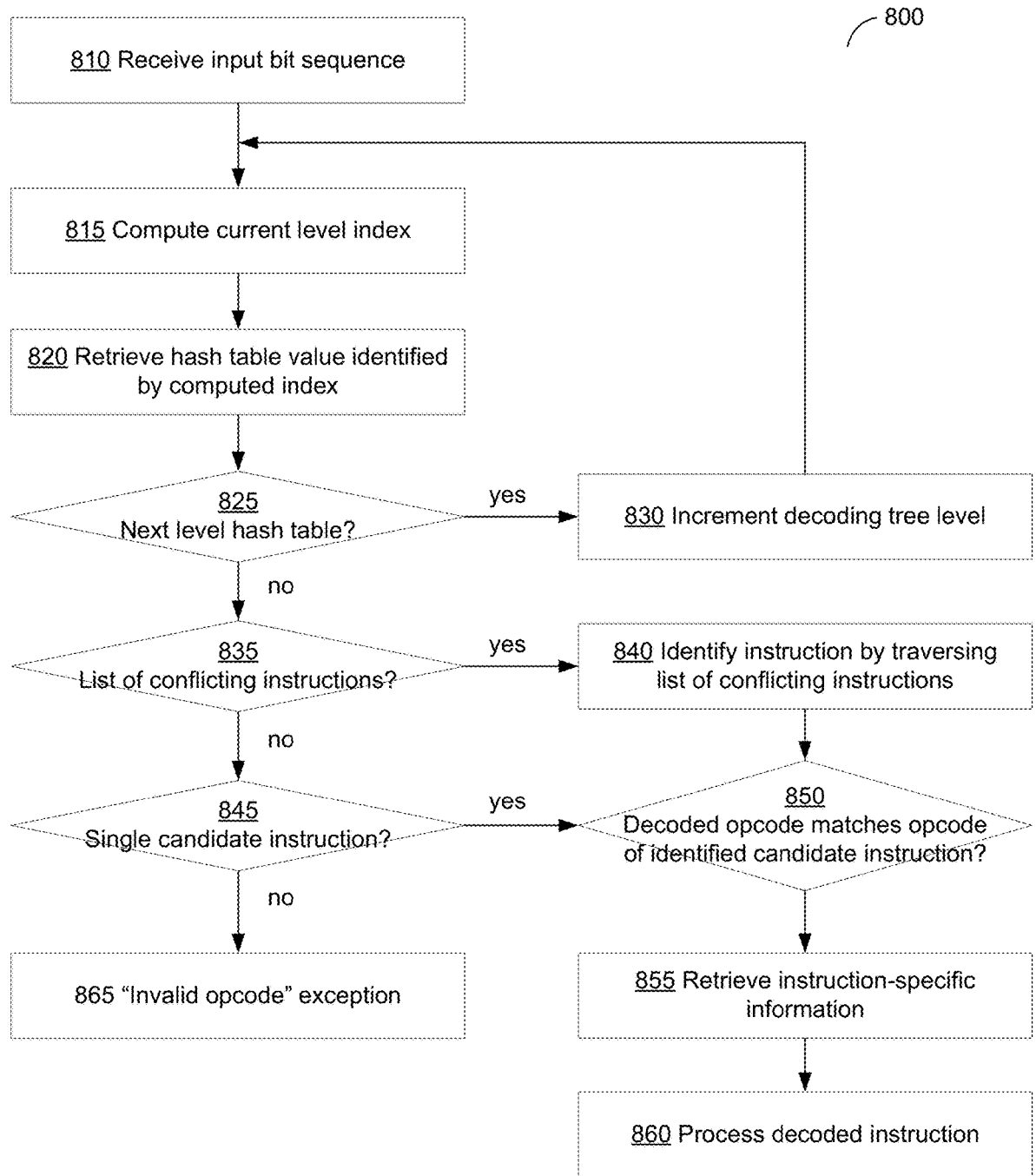
FIG. 8 depicts a flowchart of an example method of instructing decoding, in accordance with one or more aspects of the present disclosure.

Accordingly, the instruction decoding process using the constructed decoding tree would involve, for a given input bit sequence, retrieving from the hash table implementing the current level of the decoding tree, the result of combining the input bit sequence with the mask specifying the bit positions of the current level index; the decoding procedure is repeated if the computed index references two or more instructions of the instruction set, until a single instruction is identified, as described in more detail herein below with reference to FIG. 8.

Figure 7:
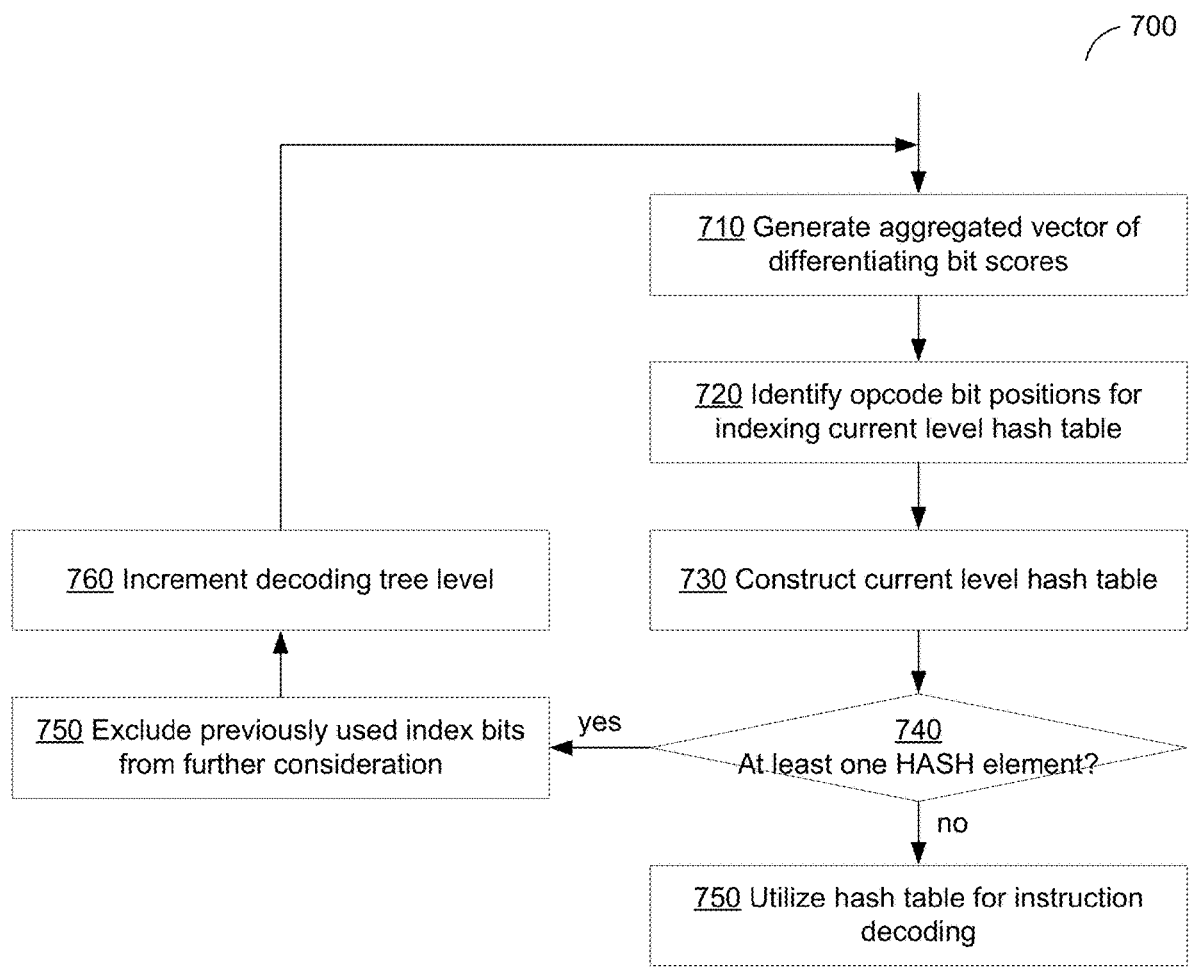
FIG. 7 depicts a flowchart of an example method of constructing an instruction decoding tree, in accordance with one or more aspects of the present disclosure.

FIG. 7 depicts a flowchart of an example method of constructing an instruction decoding tree, in accordance with one or more aspects of the present disclosure. Method 700 and/or each of its individual functions, routines, subroutines, or operations may be performed by one or more processors of the computer system (e.g., the example computer system 1000 of FIG. 9) implementing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other.

At block 710, a computer system implementing the method may generate an aggregated vector of differentiating bit scores representing at least a subset of a set of processor instructions. In certain implementations, generating the aggregated vector of differentiating bit scores may involve traversing the instruction set and, for each opcode bit of a given instruction, computing a number of instructions that have the complementary (with respect to the current bit) bit value. The resulting vector of differentiating bit scores for the given instruction may be multiplied by a weight factor reflecting the frequency of occurrence of the given instruction in the input stream of instructions, as described in more detail herein above.

At block 720, the computer system may identify, based on the aggregated vector of differentiating bit scores, one or more opcode bit positions to be utilized for indexing the hash table implementing the current level of the instruction decoding tree being constructed. In certain implementations, the bit positions having the largest differentiating bit scores in the aggregated vector of differentiating bit scores may be selected, as described in more detail herein above.

At block 730, the computer system may construct a hash table implementing the current level of the instruction decoding tree, such that the hash table is indexed by the opcode bits identified by the opcode bit positions identified at block 720. Each element of the hash table may identify a single instruction, a next level hash table, a list of conflicting instructions, or an invalid opcode error, as described in more detail herein above.

Responsive to determining, at block 740, that at least one element of the constructed hash table references another hash table, the method may, at block 750, exclude from further consideration as candidate indexing bits the bit positions that have been using for indexing the current level hash table, and then, upon incrementing, at block 760, the decoding tree level, loop back to block 710. Otherwise, at block 770, the computer system may utilize the hash table for decoding a sequence of instructions, as described in more detail herein above.

FIG. 8 depicts a flowchart of an example method of instruction decoding, in accordance with one or more aspects of the present disclosure. Method 800 and/or each of its individual functions, routines, subroutines, or operations may be performed by one or more processors of the computer system (e.g., the example computer system 1000 of FIG. 9) implementing the method. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

At block 810, a computer system implementing the method may receive an input bit sequence to be decoded. In an illustrative example, the input bit sequence may be represented by fixed size bit string retrieved from an input stream of instructions.

At block 815, the computer system may compute an index value for indexing the hash table implementing the current level of the instruction decoding tree. The index value may be computed by applying, to the input bit sequence, an index mask associated with the hash table implementing the current level of the instruction decoding tree.

At block 820, the computer system may retrieve, from the hash table implementing the current level of the instruction decoding tree, a record identified by the computed index value.

Responsive to determining, at block 825, that the retrieved record identifies another hash table, the computer system may, at block 830, increment the decoding tree level and loop back to block 815.

Otherwise, responsive to determining, at block 835, that the retrieved record identifies a list of conflicting instructions, the computer system may, at block 840, traverse the instruction list and compare each candidate instruction on the list to the opcode bits being decoded, masked by the opcode mask corresponding to the candidate instruction, until a match is detected (i.e., the opcode being decoded masked by the opcode mask corresponding to the candidate instruction matches the opcode of the candidate instruction, as verified at block 850).

Otherwise, responsive to determining, at block 845, that the retrieved record identifies a single candidate instruction, the computer system may, upon determining, at block 850, that the opcode being decoded masked by the opcode mask corresponding to the identified candidate instruction matches the opcode of the identified candidate instruction, retrieve, at block 855, a data structure storing instruction-specific information associated with the identified instruction, and may further, at block 860, process the decoded instruction (e.g., by performing a binary translation operation with respect to the decoded instruction, by emulating the decoded instruction, or by identifying and displaying a mnemonic text string associated with the decoded instruction), as described in more detail herein above.

Otherwise, no valid instruction opcode has been identified in supported instruction set and the computer system may, at block 865, throw an execution exception indicating an invalid opcode.

The decoding procedure may be further optimized by implementing additional tree element types. Checks for these additional element types may be further chained to the chain of blocks 825, 835, and 845.

The above description and figures illustrate various aspects of the present disclosure using the example truncated instruction set. However, the decoding methods described herein may simultaneously be applied to any number of instruction sets. Each instruction set may have either own decoding hash table hierarchy or multiple instruction sets might be organized to a joint superset in which instruction opcodes are extended with numeric identifier of a particular instruction set. Conversely, an instruction set may be split into subsets based on the instruction frequency (weight value), such that each subset would have its own decoding hash tree, but in case of search misses in the top hash trees, the decoding algorithm would continue to look up the instruction in lower level trees.

Figure 9:
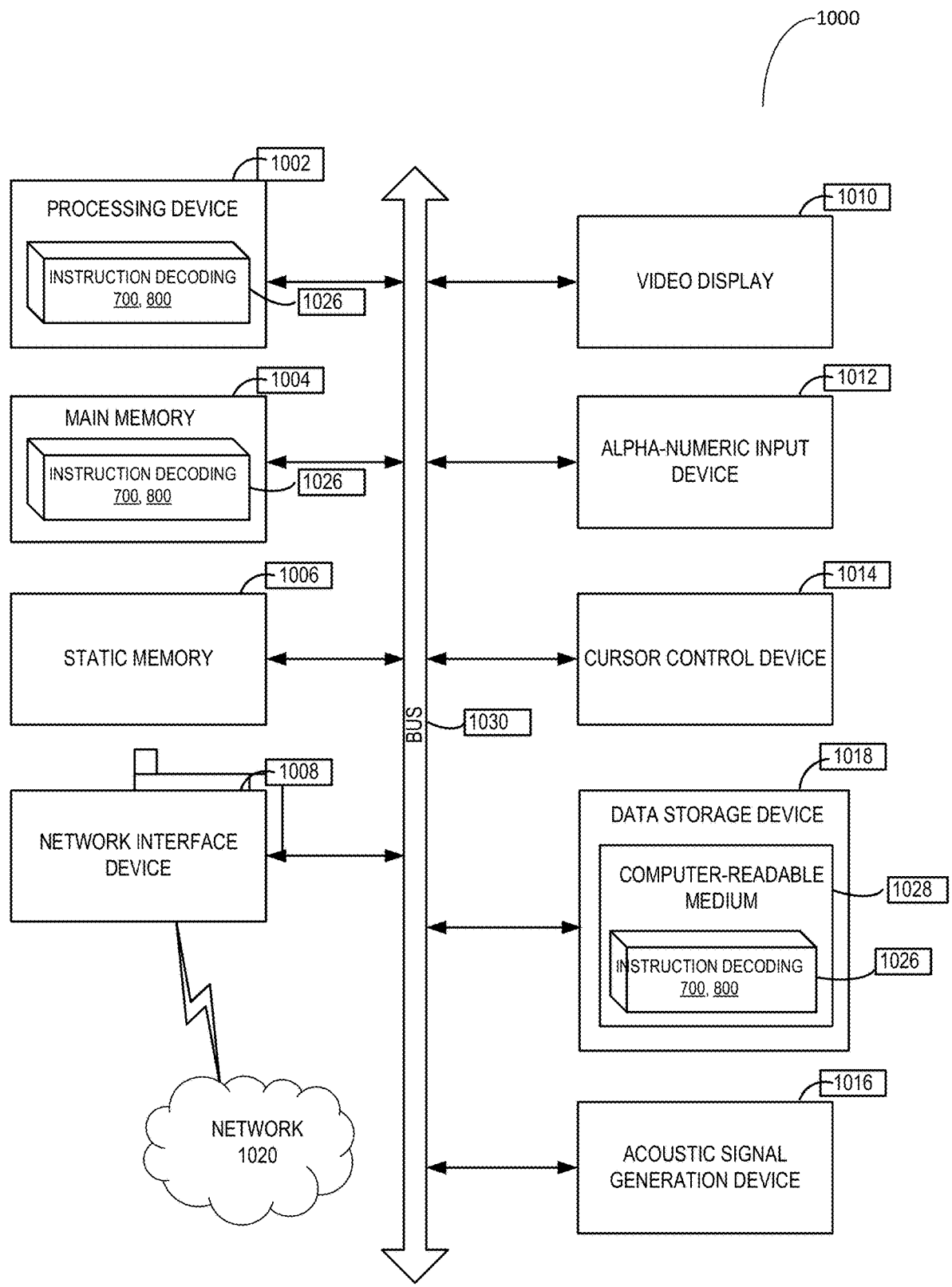
FIG. 9 schematically illustrates a component diagram of an example computer system which may perform any one or more of the methods described herein.

FIG. 9 schematically illustrates a component diagram of an example computer system 1000 which may perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions implementing methods 700 and/or 800 for constructing a decoding tree and instruction decoding, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. The Executable instructions 1026 may comprise executable instructions encoding various functions of method 700 and/or 800 for constructing a decoding tree and instruction decoding, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMS), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
generating, by a computer system, an aggregated vector of differentiating bit scores representing at least a subset of a set of processor instructions;
identifying, based on the aggregated vector of differentiating bit scores, one or more opcode bit positions; and
constructing a hash table implementing a current level of a decoding tree representing the subset of the set of processor instructions, wherein the hash table is indexed by one or more opcode bits identified by the one or more opcode bit positions.

2. The method of claim 1, further comprising:
utilizing the hash table for decoding a sequence of instructions.

3. The method of claim 1, further comprising:
responsive to determining that at least one index value applied to the hash table identifies two or more instructions:
identifying, based on the aggregated vector of differentiating bit scores, a second subset of opcode bit positions among a plurality of opcode bit positions that were not previously used for indexing the hash table, and
constructing a second hash table implementing a next level of the decoding tree, wherein the second hash table is indexed by one or more opcode bits identified by the second subset of opcode bit positions.

4. The method of claim 1, wherein
generating the aggregated vector of differentiating bit scores further comprises:
for each opcode bit of a given instruction, determining a number of instructions that have a complementary bit value.

5. The method of claim 4, further comprising:
multiplying a vector of differentiating bit scores for the given instruction by a weight factor reflecting a frequency of occurrence of the given instruction in an input stream of instructions.

6. The method of claim 1, wherein
identifying the one or more opcode bit positions further comprises:
selecting bit positions corresponding to largest values of differentiating bit scores.

7. The method of claim 1, wherein
the hash table has an element representing a pointer to a second hash table.

8. The method of claim 1, wherein
the hash table has an element representing a pointer to a list of conflicting instructions.

9. The method of claim 1, wherein
the hash table has an element representing a pointer to an instruction-specific data structure.

10. A method, comprising:
computing, by a computer system, a hash table index value by applying a hash table indexing mask to an input bit sequence;
retrieving, from a hash table implementing a current level of a decoding tree, a record identified by the hash table index value; and
responsive to determining that the record uniquely identifies an instruction, retrieving a data structure storing instruction-specific information associated with the identified instruction.

11. The method of claim 10, wherein
determining that the record uniquely identifies the instruction further comprises:
computing an opcode by applying an opcode mask associated with the identified instruction to the input bit sequence; and
determining that the computed opcode matches a known opcode value for the identified instruction.

12. The method of claim 10, further comprising:
responsive to determining that the record identifies a second hash table:
identifying a second hash table indexing mask associated with the second hash table;
computing a second hash table index value by applying the second hash table indexing mask to the input bit sequence, and
retrieving, from the second hash table, a new record identified by the second hash table index value.

13. A non-transitory computer-readable storage medium comprising executable instructions that, when executed by a computer system, cause the computer system to:
generating an aggregated vector of differentiating bit scores representing at least a subset of a set of processor instructions;
identifying, based on the aggregated vector of differentiating bit scores, one or more opcode bit positions; and constructing a hash table implementing a current level of a decoding tree representing the subset of the set of processor instructions, wherein the hash table is indexed by one or more opcode bits identified by the one or more opcode bit positions.

14. The non-transitory computer-readable storage medium of claim 13, further comprising executable instructions that, when executed by the computer system, cause the computer system to:
    responsive to determining that at least one index value applied to the hash table identifies two or more instructions:
    identifying, based on the aggregated vector of differentiating bit scores, a second subset of opcode bit positions among a plurality of opcode bit positions that were not previously used for indexing the hash table, and
    constructing a second hash table implementing a next level of the decoding tree, wherein the second hash table is indexed by one or more opcode bits identified by the second subset of opcode bit positions.

15. The non-transitory computer-readable storage medium of claim 13, wherein generating the aggregated vector of differentiating bit scores further comprises:
    for each opcode bit of a given instruction, determining a number of instructions that have a complementary bit value; and
    multiplying a vector of differentiating bit scores for the given instruction by a weight factor reflecting a frequency of occurrence of the given instruction in an input stream of instructions.

16. The non-transitory computer-readable storage medium of claim 13, wherein identifying the one or more opcode bit positions further comprises: selecting bit positions corresponding to largest values of differentiating bit scores.

17. The non-transitory computer-readable storage medium of claim 13, wherein the hash table has an element representing a pointer to a list of conflicting instructions.

18. The method according to claim 10, wherein
    the hash table indexing mask applied to the input bit sequence is associated with the current level of the decoding tree.

19. The method according to claim 10, wherein
    responsive to determining that the record identifies another hash table retrieving a data structure storing instruction specific information associated with the identified instruction.

20. The method according to claim 10, wherein
    responsive to determining that the record identifies a list of conflicting instructions executing a process comprising the steps of:
    traversing the list of conflicting instructions;
    masking each conflicting instruction in the list of conflicting instructions with an opcode mask corresponding to a candidate instructions; and
    comparing each masked conflicting instruction to a set of opcode bits currently being decoded by the computer system; and
    responsive to determining a match of a masked conflicting instruction to the set of opcode bits retrieving the data structure storing instruction-specific information associated with the identified instruction.

21. The according to claim 10, wherein
    the hash table indexing mask specifies bit positions of the current level of the decoding tree.

* * * * *